Sept. 4, 1956          D. G. KERWIN          2,761,313
HARDNESS TESTER
Filed April 28, 1953
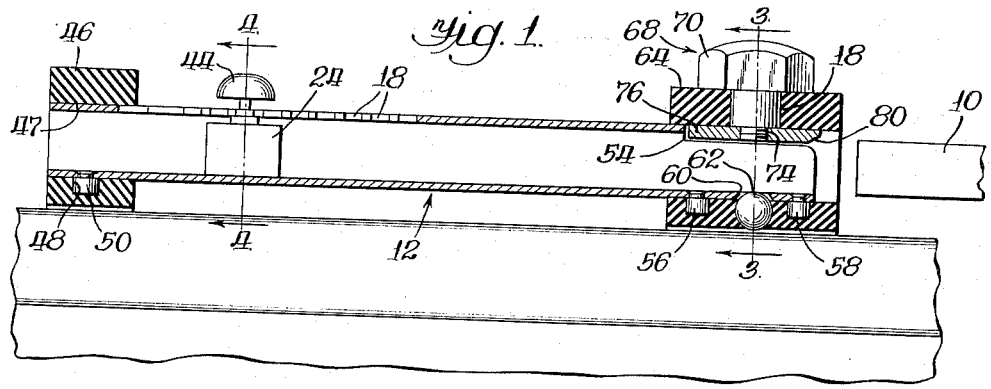
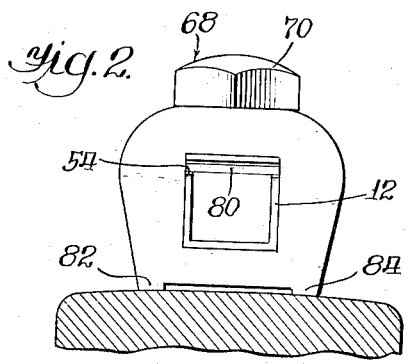
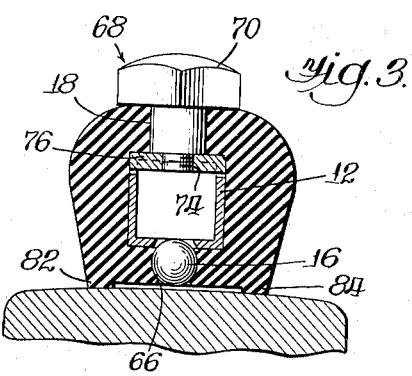
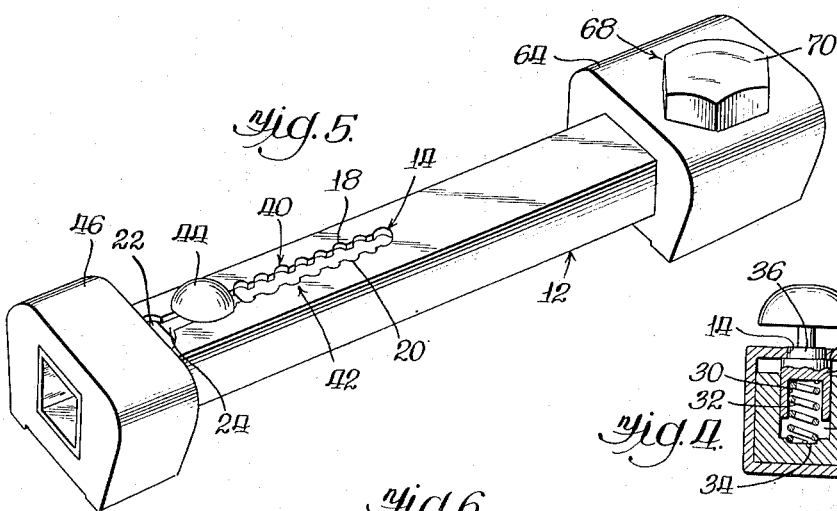
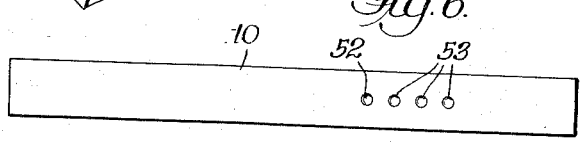
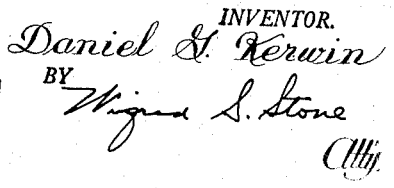
INVENTOR.
Daniel G. Kerwin
BY

United States Patent Office 2,761,313
Patented Sept. 4, 1956

2,761,313

HARDNESS TESTER

Daniel G. Kerwin, Chicago, Ill., assignor to Welding Service, Inc., Chicago, Ill., a corporation of California Application April 28, 1953, Serial No. 351,560

4 Claims. (Cl. 73—82)

This invention relates to a tester for determining the hardness of metal bodies. It comprises improvements to the tester shown in United States Patent No. 2,001,097 to Frickey. The metal hardness tester shown in that patent has come into very general use not only for the testing of rail ends but for testing metal surfaces generally.

As illustrated in that patent and the drawings herewith, the tester consists of a bar of known hardness 10, a ball of substantially harder metal 16, and means for holding the ball between the bar and a metal surface whose hardness is to be determined. A blow on the top of the bar causes the ball to make a circular impression in the bottom of the bar and in the metal surface being tested. The diameters of the two circular impressions are then accurately measured and the diameters are substituted in the equation:

$$H = \left(\frac{x}{y}\right)^2 \times 400$$

where $x$ represents the diameter of the impression in the test bar, $y$ represents the diameter of the impression in the body being tested, and 400 is the Brinell hardness of the test bar.

One object of this invention is to assure a right-angle impact of the ball with the metal surface being tested. In order to do this, the bar 10 should be substantially parallel to the surface being tested, and a fixed lateral relationship between the bar and the ball should exist. The rubber block which holds the ball is flexible, and if the hammer force is not at right angles to the metal surface being tested, the ball may move slightly along that surface. The tester shown in the Frickey patent relies upon the operator to provide this parallel relationship. Where he does not get the parallel relationship, the impression in the metal surface being tested is slightly oval. This impairs the accuracy of the computation because the foregoing formula holds true for a comparison of circular or like impressions but not for circular and oval impressions. A feature of this invention is the provision of a support on that end of the holder away from the tester which will support the bar parallel to a flat surface. There are situations where this end support cannot be used, but in most applications, as for example, longitudinally along the top of a rail, the bar holder can be rested on the surface so that it will be exactly parallel. This additional rest when used completely eliminates oval shaped impressions in the metal being tested.

A second object of this invention is to eliminate swedging of the bar by hammer blows. Each one of applicant's bars, when properly used, is capable of 80 tests, 20 impressions on each side. It will be noticed that while the indentation is being placed on the lower side of the bar, a blow is delivered to the upper side of the bar. This blow from the head 18 is directly against the bar 10 and it hardens slightly the upper surface of the bar 10 and frequently swedges it so that a portion is not quite in the proper plane. Either hardening or deformation will alter the impression made in the bar when this portion of the bar comes adjacent the ball for testing. A feature of this invention is the provision of a comparatively large drive plate on the bottom of the hammer head. This plate distributes the blow over a substantial surface of the bar while transmitting the blow to the ball equally well.

Another object of this invention is to hold the bar in the sleeve sufficiently tightly so that it will not drop out no matter in what position the sleeve is held, while nevertheless permitting the bar to be moved lengthwise of the sleeve. A feature of this invention is the mounting of the drive plate in the rubber block so that its inner surface is in the path of one surface of the bar and must be pressed outwardly against the rubber block in order for the bar to pass. The frictional engagement of the flat surface and the bar is sufficient to hold the bar from dropping out while permitting the bar to be moved.

Another object of this invention is to move the bar from a used position to a new position by means of an external control instead of by pushing the bar. A feature of this invention is a slide block controlled from the outside of the holder so that the slide block may be fully retracted and the bar fully inserted in the holder. The operation is then to push the bar step by step out of the holder by means of the slide control for half its length, after which the bar is removed and its used end inserted in the holder.

Still another object of this invention is to provide a superior engagement for the tool with the work. In the Frickey patent, the bearing is held between the bar and the work by a soft rubber block. A feature of this invention is the provision of two parallel skids or legs along two opposite edges of the rubber blocks. Where the tester is used on rail, these legs assist in holding it on the longitudinal center of the rail.

Improved means for holding the rubber blocks on the holder for the test bar are provided.

These and such other objects as may hereinafter appear are attained in the embodiment of the invention shown in the accompanying drawings wherein:

Fig. 1 is a longitudinal cross section of the improved tester resting lengthwise on a rail ball;

Fig. 2 is an elevation of the work end of the tester;

Fig. 3 is a sectional view taken on the line 3—3 of Fig. 1;

Fig. 4 is a sectional view taken on the line 4—4 of Fig. 1;

Fig. 5 is a perspective view of the tester viewed from above; and

Fig. 6 is a plan view of the bar showing impressions.

Continuing to refer to the drawings, the numeral 12 identifies a sleeve having a square cross section in which may slide a test bar 10 also of square cross section. At what may be referred to as the handle end of the tester, in the top wall of the sleeve 12, there is a guideway 14 having two facing serrated edges 18 and 20, the serrations on the two edges being in complemental pairs and being cut on the same radius from points in the longitudinal axis of the guideway. There are ten pairs of serrations so that ten equally spaced positions are provided. The guideway terminates toward the handle end in a larger circular opening 22.

Mounted in the sleeve 12 is a slide 24 whose inner end is adapted to engage the inner end of the bar 10. Referring to Fig. 4, the slide 24 has an upwardly open, vertical, cylindrical chamber 26 in which is slideably mounted a plunger 28. The lower end of the plunger 28 contains a downwardly open, circular chamber 30 in which seats the upper end of an expansion spring 32.

The lower end of spring 32 seats in a conical bottom 34 of chamber 26. The plunger 28 is separated from a circular neck 36 by a shoulder 38. This neck 36 has a diameter slightly less than the diameter of two facing curved serrations such as 18 and 20 so that the spring 32 will force the neck into complemental serrations while the shoulder 38 will continuously engage the under side of the top of the sleeve 12. Above the neck 36 is a shank 38 having a diameter slightly less than the width of the guideway 14, that is, less than the distance between the points 40 and 42 of Fig. 5. A thumb knob 44 is mounted on the shank 38.

In order to mount the slide 24 in the sleeve 12, the slide 24 is inserted in the sleeve's end with the chamber 26 adjacent the guideway 14. One end of the spring 32 is inserted in the chamber 30 of the plunger 28, and inasmuch as the diameter of this plunger 28 is slightly less than the opening 22 in the guideway, it is pushed in until the flat bottom of the knob 44 engages the sleeve 12. This brings the shank 38 in alignment with the guideway so that the knob 44 may be moved to the right. When this has been done, a block 46 made of soft vulcanized rubber having a square passageway 47 therethrough adapted to fit snugly over the sleeve 12 is pushed over the end. This rubber block has a small cylindrical hole 48 in which seats a downwardly projecting lug 50 rigidly mounted in the bottom wall of the sleeve 12. The rubber is quite soft and will stretch so that this lug 50 may be inserted in the hole 48. The width of the block 46 is such that it will slightly close the hole 22, see Fig. 5, and this prevents the knob and slide assembly from working out of the guideway.

The serrations 18 and 20 are on centers spaced by one-quarter of an inch. The end of the guideway 14 is spaced from the ball 16 by approximately half the length of the bar. It follows that when the detent slide 24 is in the Number 1 pair of serrations, as in Fig. 5, the right end of the bar will be a short distance from the ball. The operator will make a test in this position, and then use the knob 44 to eject the bar. He then returns the knob to the pair of serrations to the right of the first position and proceeds with his computations. The holder is in position to receive the bar for the next test. This arrangement is superior from an operator's standpoint to that shown in the Frickey patent where the operator has more difficulty in determining where on the bar the last impression was made. By this new arrangement, the operator has little chance of making a new impression on an old impression. When he draws out the bar used once only, he sees the impression 52 shown in Fig. 6. Thereafter, impressions will come as indicated by the numeral 53. He always knows that he is working away from the center and when he gets ten on one side, he turns the bar around while restoring the detent assembly to the position shown in Fig. 5.

Referring now to the testing end of the device, the sleeve 12 has its upper wall cut away and a small portion of the upper part of each of the two side walls as generally indicated by the numeral 54, see Figs. 1 and 2. From the lower wall of the sleeve 12 depend two lugs 56 and 58 longitudinally centrally of the bottom is an opening 60. This opening is slightly smaller than the diameter of the ball 16 but the thickness of the lower wall of the sleeve 12 is such that the upper portion 62 of the ball can project into the sleeve 12, and yet not drop into it. The ball is held in position by the rubber block 64 which contains a cavity for the ball. This cavity has a small opening 66. The lower wall of the large opening through the rubber block has cavities in which seat lugs 56 and 58 mounted on the bottom of the sleeve 12. The block fits snugly around the sleeve 12 and the lugs hold the block against lateral movement, thereby exactly positioning the ball 16 in the opening 60.

Mounted in the upper wall of the opening through the block is a drive assembly generally identified by the numeral 68 which comprises a hexagon headed bolt 70, having a smooth shank 72 with a short threaded end 74. This end is tightly screwed into a strong drive plate 76 whose lower surface is parallel to the top surface of the bar 10. With the bar removed, this plate occupies the position shown in Fig. 1, that is, the bottom of the plate is below the plane of the inside top wall of the sleeve 12. Its outwardly directed edge is beveled at 80. When the bar 10 is inserted, it engages the beveled edge 80 and presses the plate 76 upwardly and the fact that the plate is held by the flexible block 64 assures a flush engagement between the lower surface of the plate and the top of the bar. The area is several times that of the drive area provided in the Frickey patent. Importantly, the rubber block exerts substantial pressure on the drive plate, which in turn holds the bar firmly although it can be pushed in the sleeve easily. It will not drop out of the sleeve when the sleeve is held vertically.

In use, the hammer blow acting through this plate 76 does not alter the upper work surface of the bar.

The blocks 46 and 64 have like cross sections. Along the two side edges of the blocks are depending legs or skids 82 and 84. As illustrated in Fig. 2, they are an improvement over a flat surface when the device is laid lengthwise of a rail ball which has a slight crown.

Having thus described his invention, applicant claims:

1. A metal hardness tester comprising a frame for holding a bar having a rectangular cross section and of known hardness, means on the frame for holding an impression ball between said bar and a metal surface to be tested, a rectangular flat drive head having a width substantially coextensive with that of the bar and a length substantially twice the width, and means on the frame for holding said head against the surface of the bar opposite to the surface engaging the impression ball.

2. A metal hardness tester comprising a sleeve of rectangular cross section open at one end, there being an opening in the bottom wall of the sleeve and a vertically aligned, opening in the top wall of the sleeve, said latter opening being rectangular and extending the full width of the sleeve and having a length approximately twice its width, a spherical impression member positioned adjacent the outside of the lower opening and of a size such that its surface can penetrate the interior of the sleeve, a drive plate having a flat surface area slightly less than the area of the upper opening, and means mounted on the sleeve for holding said surface of the plate adjacent to and in a plane substantially parallel with said upper opening.

3. A metal hardness tester comprising a sleeve of rectangular cross section open at one end, there being an opening in the bottom of the sleeve near one end and a second opening in the top of the sleeve vertically aligned with the lower opening and extending the full width of the sleeve and open-ended, said upper opening being rectangular and having a length approximately twice its width, a spherical impression member positioned adjacent the outside of said lower opening and of a size such that its surface can penetrate the interior of the sleeve, a rectangular drive plate having a flat lower surface approximating the area of the upper opening, and means on the sleeve for yieldably holding said plate through said upper opening so that said lower surface is parallel to and below the inside plane of the top wall of the sleeve.

4. The metal hardness tester of claim 3 wherein the lower, outer edge of the drive plate is beveled.

References Cited in the file of this patent

UNITED STATES PATENTS

| | | |
|---|---|---|
| 1,125,912 | Ringland et al. | Dec. 19, 1915 |
| 1,348,897 | Ringland | Aug. 10, 1920 |
| 2,001,097 | Frickey | May 14, 1935 |

FOREIGN PATENTS

| | | |
|---|---|---|
| 29,207 | Sweden | Mar. 11, 1909 |